US008958120B2

(12) United States Patent
Kitahara

(10) Patent No.: US 8,958,120 B2

(45) Date of Patent: Feb. 17, 2015

(54) PRINT CONTROL APPARATUS, PRINT CONTROL METHOD, AND STORAGE MEDIUM

(71) Applicant: Canon Kabushiki Kaisha, Tokyo (JP)

(72) Inventor: Atsushi Kitahara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/314,463

(22) Filed: Jun. 25, 2014

(65) Prior Publication Data

US 2015/0002861 A1 Jan. 1, 2015

(30) Foreign Application Priority Data

Jun. 28, 2013 (JP) ................................ 2013-137058

(51) Int. Cl.

*G06F 15/00* (2006.01)
*G06F 3/12* (2006.01)
*B65H 7/02* (2006.01)
*G06K 15/02* (2006.01)
*G06K 15/00* (2006.01)

(52) U.S. Cl.

CPC .......... *G06K 15/1868* (2013.01); *G06K 15/408* (2013.01)
USPC .......... 358/1.2; 358/1.13; 271/227; 271/230; 271/265.01

(58) Field of Classification Search

CPC ................................................ B65H 2220/01
See application file for complete search history.

(56) References Cited

U.S. PATENT DOCUMENTS

| | | | | |
|---|---|---|---|---|
| 8,444,245 | B2 | 5/2013 | Furuhata | |
| 2009/0154975 | A1 * | 6/2009 | Ogata et al. | 399/388 |
| 2012/0025438 | A1 * | 2/2012 | Fukatsu et al. | 270/58.07 |
| 2013/0082432 | A1 * | 4/2013 | Tsuji | 270/58.17 |

FOREIGN PATENT DOCUMENTS

JP 05-309925 A 11/1993

* cited by examiner

*Primary Examiner* — Thomas Lett

(74) *Attorney, Agent, or Firm* — Canon USA, Inc., IP Division

(57) ABSTRACT

A print control apparatus includes an obtaining unit and a specification unit. The obtaining unit obtains positional information for specifying positions of ends of a print medium detected by a sensor when the print medium is conveyed along a conveyance path such that a print medium center is aligned with a conveyance path center. The specification unit specifies, when positions of both ends of the print medium are specified by the obtained positional information, a width of the print medium in accordance with the specified positions of both ends, and specifies, when the position of only one end of the print medium is specified by the positional information, a width corresponding to a length twice as long as a distance between the specified position of the one end of the print medium and a position corresponding to the conveyance path center as the width of the print medium.

13 Claims, 7 Drawing Sheets

FIG. 7

| | | | |
|---|---|---|---|
| SHEET SIZE | SHEET WIDTH | SHEET LENGTH | ASPECT RATIO |
| L | 89.0 | 127.0 | 1.43 |
| ENVELOPE Y6 | 98.0 | 190.0 | 1.94 |
| POSTCARD | 100.0 | 148.0 | 1.48 |
| 4×6 | 101.6 | 152.4 | 1.50 |
| ENVELOPE N3 | 120.0 | 235.0 | 1.96 |
| 2L | 127.0 | 178.0 | 1.40 |
| RETURN POSTCARD | 200.0 | 148.0 | 0.74 |
| 6P | 203.2 | 254.0 | 1.25 |
| A4 | 210.0 | 297.0 | 1.41 |
| LETTER | 215.9 | 279.4 | 1.29 |

300 301 302 303

PRINT CONTROL APPARATUS, PRINT CONTROL METHOD, AND STORAGE MEDIUM

BACKGROUND OF THE INVENTION

1. Field of the Invention

The present invention relates to a print control apparatus that specifies a width of a print medium, a print control method, and a storage medium.

2. Description of the Related Art

A technology has been known for detecting a width of a print sheet by a sensor. Japanese Patent Laid-Open No. 05-309925 discloses that positions of both end portions of the print sheet are detected by a sensor mounted in the vicinity of a printing head to specify the width of the print sheet.

According to a method disclosed in Japanese Patent Laid-Open No. 05-309925, the sheet width of the print sheet is specified by detecting both the end portions of the print sheet. Therefore, specification of a print sheet width may be failed when, for example, the width is so long that only one end portion of the print sheet is detectable or when only one end portion of the print sheet is detected due to a detection error.

SUMMARY OF THE INVENTION

The present invention has been made to solve the above-described problem by providing a print control apparatus, as well as a print control method, that can appropriately specify a width of a print medium, and a storage medium.

According to an aspect of the present invention, a print control apparatus includes an obtaining unit configured to obtain positional information for specifying positions of one end or both ends of a print medium detected by a sensor when the print medium is conveyed in a printing mechanism along a conveyance path such that a center of the print medium is aligned with a center of the conveyance path, and a specification unit configured to specify, in a case where positions of both ends of the print medium are specified by the positional information obtained by the obtaining unit, a width of the print medium in accordance with the specified positions of both ends, and to specify, in a case where the position of only one end of both ends of the print medium is specified by the positional information, a width corresponding to a length twice as long as a distance between the specified position of the one end of the print medium and a position corresponding to the center of the conveyance path as the width of the print medium. Further features of the present invention will become apparent from the following description of exemplary embodiments with reference to the attached drawings.

BRIEF DESCRIPTION OF THE DRAWINGS

FIG. 7 illustrates a sheet size table according to the exemplary embodiment.

DESCRIPTION OF THE EMBODIMENTS

Exemplary Embodiments

Hereinafter, an exemplary embodiment will be described in detail.

Figure 1:
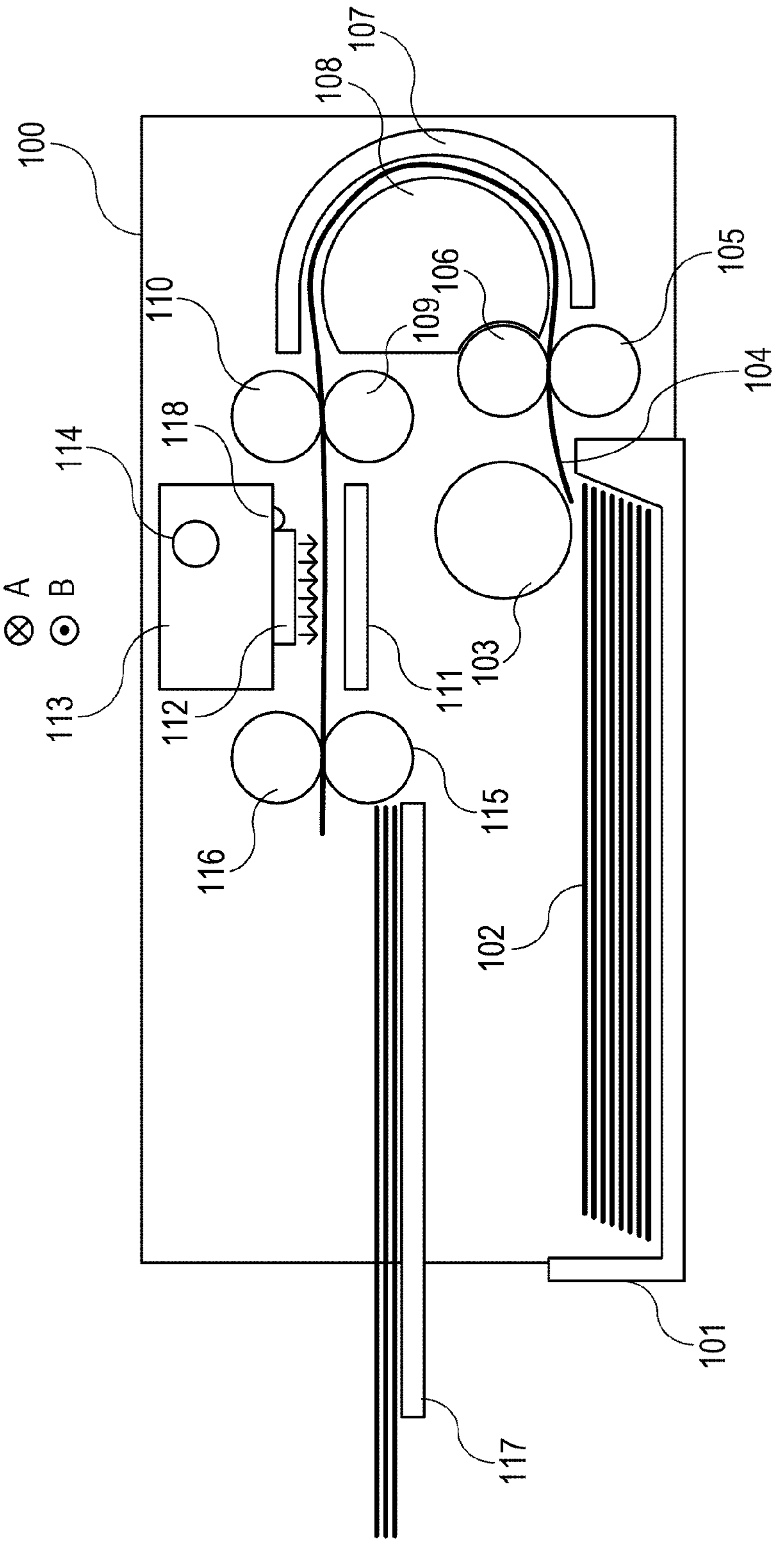
FIG. 1 illustrates a printing mechanism incorporated in a printing apparatus according to an exemplary embodiment.

FIG. 1 illustrates a printing mechanism incorporated in a printing apparatus 100 according to the present exemplary embodiment. A sheet feeding tray 101 stores a stack 102 of print sheets 102. A sheet feeding roller 103 feeds a print sheet from the print sheet stack 102 stored in the sheet feeding tray 101 to the nip between pair of conveyance rollers 105 and 106. The print sheet fed by the sheet feeding roller 103 and conveyed by the conveyance rollers 105 and 106 is denoted by 104. As illustrated in FIG. 1, the print sheet 104 passes through a conveyance path formed by members 107 and 108 by the conveyance rollers 105 and 106 and is conveyed to the nip between another pair of conveyance rollers 109 and 110. The conveyance rollers 109 and 110 convey the print sheet 104 to a platen 111.

A carriage 113 to which a printing head 112 is mounted is provided above the platen 111. The carriage 113 performs reciprocal scanning along a guide rail 114 in a direction A (direction from the front to the back in FIG. 1) and a direction B (direction from the back to the front in FIG. 1) illustrated in FIG. 1. The printing apparatus 100 applies drive pulses to the printing head 112 to cause the printing head to eject a recording material such as ink, while driving the carriage 113 in the direction A and the direction B. As the recording material is ejected from the printing head 112 to the print sheet 104 in this manner, an image of a print target is printed on the print sheet 104. The print sheet 104 on which the image has been printed is conveyed to the nip between a pair of sheet discharging rollers 115 and 116 by the conveyance rollers 109 and 110. The sheet discharging rollers 115 and 116 discharge the print sheet 104 onto a sheet discharging tray 117.

A reflection type optical sensor, serving as a sheet sensor 118, is carried by the carriage 113. The printing apparatus 100 obtains an output level (voltage) indicating an intensity of light received by the sheet sensor 118 and determines whether or not the output level corresponds to light reflected from the print sheet. It is thus possible to detect whether or not the print sheet exists in the position where the light is received. As described above, the sheet sensor 118 is mounted to the carriage 113 and is moved to scan the print sheet 104, together with the printing head 112. By detecting whether or not the print sheet 104 exists in a range where the scanning by the sheet sensor 118 is performed, the printing apparatus 100 can locate positions of end portions of the print sheet in this range of scanning. The width of the print sheet can be detected based on the distance between the left and right end portions of the print sheet. Details of this detection processing will be described with reference to FIGS. 2A to 2C. A scanning position of the sheet sensor 118 (the carriage 113) is detected by an encoder 224 that will be described later.

The printing apparatus 100 has a printing mechanism which includes the sheet feeding tray 101, platen 111, printing head 112, carriage 113, guide rail 114, and the sheet discharging tray 117 described above, as well as various rollers which also are described above.

Figure 2A:
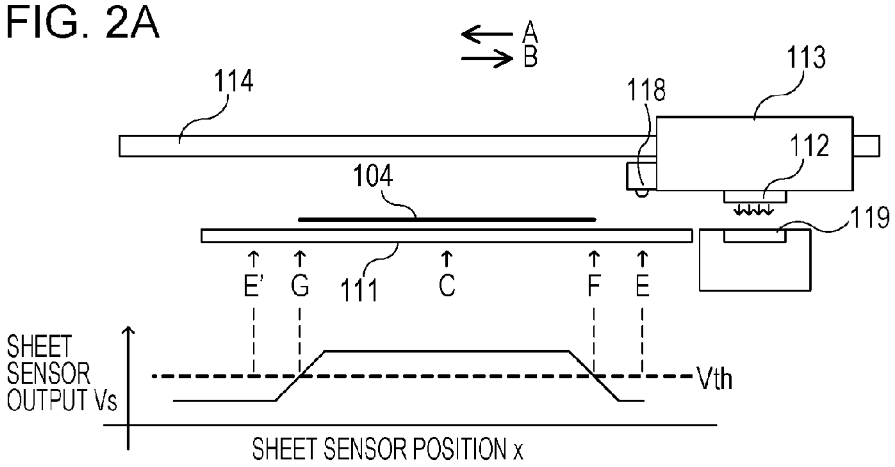
FIGS. 2A to 2C are diagrammatic illustrations explanatory of an operation for detecting a sheet width performed by a sheet sensor.
Figure 2B:
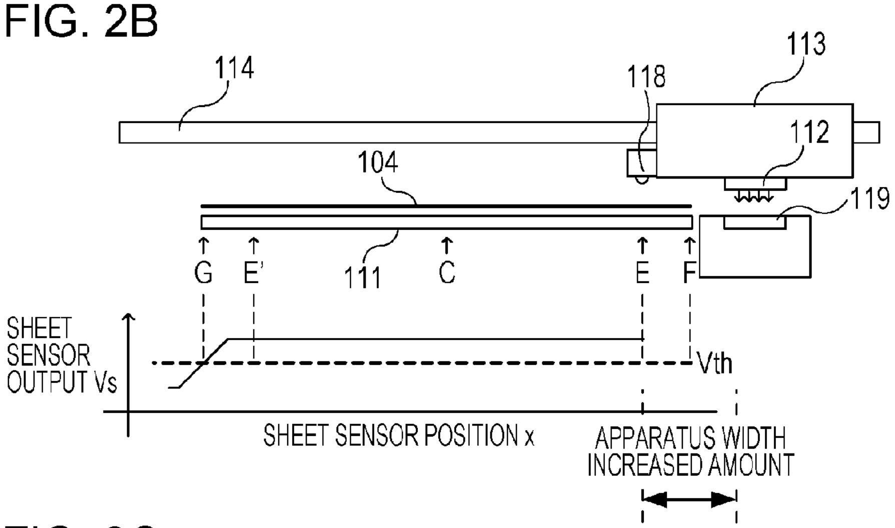
Figure 2C:
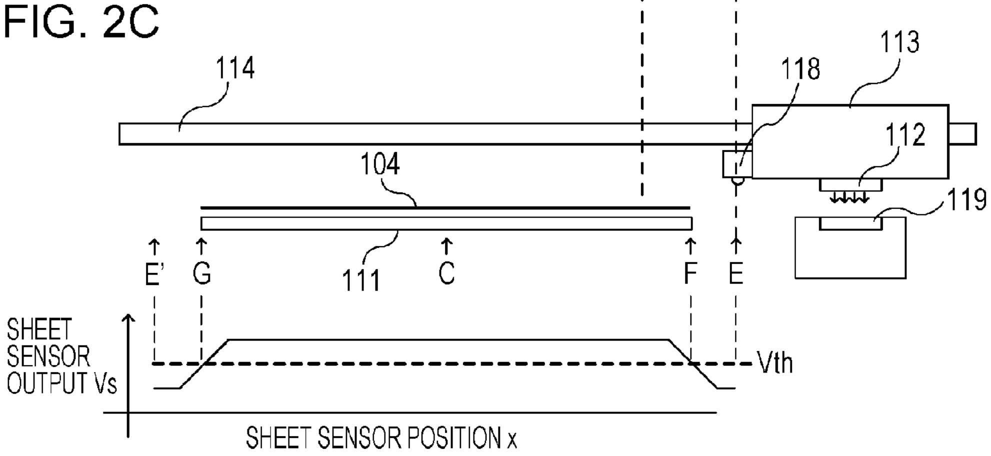

FIGS. 2A to 2C are diagrammatic illustrations explanatory of an operation for detecting the sheet width by means of the sheet sensor 118. More specifically, FIGS. 2A to 2C are schematic illustrations of a part including the platen 111 and the printing head 112 in the printing apparatus 100 of FIG. 1 as seen from the position of the sheet discharging tray 117.

As described before, the printing apparatus 100 activates the printing head to cause the printing head to eject the recording material, while reciprocally driving the carriage 113 along the guide rail 114 in the direction A and in the direction B, so that an image is printed on the print sheet 104. A head recovery mechanism 119 for capping the printing head 112 is provided at a position off the platen 111 within a stroke of the reciprocal movement of the carriage 113, i.e., the reciprocal movement of the sheet sensor the position of which is indicated by a symbol “x”. The position x of the sheet sensor is specified by the position of the carriage 113 which in turn is detected by the encoder 224 which will be described later.

The sheet sensor 118 receives light while scanning over the platen 111 and detects output levels of the received light. Graphic representations illustrated in FIGS. 2A to 2C indicate output levels (output voltages) detected by the sheet sensor 118 over the stroke of the movement of the carriage 113. According to the present exemplary embodiment, the print sheet has a bright color such as white, and the platen 111 has a dark color such as black. Thus, a high output level (strong reflected light from the print sheet) is obtained at positions position where the print sheet exists on the platen 111, whereas a low output level (weak reflected light from the platen 111) is detected at positions where the print sheet does not exist.

When the carriage 113 rests at a position where the head recovery mechanism 11 is located, the sheet sensor 118 receives reflected light at a position E on the platen 111. As the carriage 113 moves in the direction A, the output level is raised at a position corresponding to one end portion of the print sheet 104. Then, a generally constant output level is maintained during travelling of the carriage 113 and the output level falls down when the seat sensor 118 passes a position above the opposite end portion of the print sheet 104.

According to the present exemplary embodiment, in a case where the output level of the sheet sensor 118 exceeds a predetermined threshold Vth, it is determined that the print sheet 104 exists in the position where this output level is detected. Specifically, a position G and a position F in FIG. 2A are the positions corresponding to the ends of the print sheet 104, and the range between the positions G and F is determined as a range where the print sheet 104 exists. Referring to FIG. 2A, the distance between the position G and the position F is detected as the width of the print sheet 104.

In FIGS. 2A to 2C, the position indicated at E is a marginal position on the right side as viewed in FIGS. 2A to 2C in a range where the sheet sensor 118 can receive the reflected light. According to the present exemplary embodiment, in a case where the width of the print sheet conveyed to the platen 111 is large, the print sheet extends beyond the right side marginal position E in FIGS. 2A to 2C.

In addition, according to the present exemplary embodiment, the printing apparatus 100 conveys the print sheet 104 in a center alignment manner so that the widthwise center of the print sheet is aligned with the center position C of the platen 111. Therefore, when the width of the print sheet 104 is so large that the right end of the print sheet as viewed in FIGS. 2A to 2C is positioned on the right side of the right marginal position E, the right end of the print sheet 104 may not be detected.

In view of the above, according to the present exemplary embodiment, in a case where the position of the right end of the print sheet 104 is located on the right side of the position E, the printing apparatus 100 determines the sheet width of the print sheet 104 based on the distance between the center position C and the position G corresponding to the left end of the print sheet 104. More specifically, in a case where the output level obtained at the position E exceeds the threshold Vth, it is determined that the position of the right end of the print sheet 104 coincides with the position E or on the right side of the position E. In such a case, a length twice as long as the distance between the center position C and the position G is detected as the width of the print sheet 104. Since the printing apparatus 100 conveys the print sheet 104 so that the center of the print sheet 104 is aligned with the center position C, the distance between the center position C and the position G corresponding to the left end of the print sheet 104 is half the sheet width. Thus, the printing apparatus 100 can detect the length twice as long as the distance between the center position C and the position G as the sheet width. A value indicating the center position C in the scanning range of the carriage is beforehand stored in a memory in the printing apparatus 100, and the printing apparatus 100 can obtain the distance between the center position C and the position G by making reference to this value.

The threshold Vth described above may not be a fixed value. For example, the threshold Vth may be changed in accordance with the output level at the position E. The threshold Vth may also be determined in accordance with the intensity of reflected light which depends on a characteristic of the surface of the print medium. Specifically, the threshold Vth may be modified in accordance with a type of a sheet (such as plain paper or glossy paper) used for the printing. Furthermore, instead of relying on the above-described determination method based on whether or not the output level exceeds the threshold, the presence or absence of the print sheet may be detected from the result of a comparison between the output level at the position E and an output level at another position. For example, when absence of the print sheet at the position E is found based on the output level obtained at the position E, it may be determined that the print sheet exists in a region where the output level exceeds the output level at the position E by a predetermined amount or a greater amount.

In the example described hereinbefore, the sheet sensor 118 is mounted to the carriage 113, and the detection is performed while the sheet sensor 118 is moved according to the method illustrated in FIGS. 2A to 2C. This arrangement, however, is not exclusive. For example, the arrangement may be such that sheet sensors are mounted to the platen 111, separately from the carriage 113. In this case, sheet sensors corresponding in number to the number of widths of the conveyance paths for the print sheets are arrayed on the platen 111 so that the print sheet width can be determined based on the levels of the outputs from the sensors.

The processing according to the present exemplary embodiment will be described further in detail with reference to FIGS. 2A to 2C.

FIG. 2A illustrates a positional relationship between the print sheet and the printing apparatus of the present exemplary embodiment observed when the print sheet is fed to the apparatus such that the center of a print sheet of A5 size (sheet width: 148.0 mm) is aligned with the center position C of the platen 111. Drive pulses are applied to the printing head 112 while the carriage 113 is moved reciprocally in the direction A and moved back in the direction B along the guide rail 114 as described above, whereby a print target image is formed on the print sheet 104. The head recovery mechanism 119 is provided in a position out of the platen 111 along the guide rail 114 to maintain a performance of the printing head 112, and the carriage 113 is not allowed to move onto the right side with respect to the head recovery mechanism 119. The sheet sensor 118 is provided in the vicinity of an end portion of the carriage 113 and arranged in a shifted position on an opposite side to the head recovery mechanism 119 from the position of the printing head 112.

As illustrated in FIG. 2A, in a case where the sheet width is short and the position F on the head recovery mechanism 119 side is located to be closer to the center as compared with the reading marginal position E of the sheet sensor 118, it is possible to detect the positions F and G corresponding to the end portions on both the sides of the print sheet 104. In this manner, in a case where the sheet has a size at which both the end portions of the print sheet can be detected and is appropriately fed so that the center position of the print sheet is aligned with the center position C of the platen 111, the position G is detected on the center side as compared with a position E' corresponding to a symmetrical position of the reading marginal position E with respect to the center position C.

FIG. 2B illustrates a positional relationship in a case where a print sheet having a Letter size (sheet width: 215.9 mm) is fed to the apparatus according to the present exemplary embodiment so that a center of the print sheet is aligned with the center position C of the platen 111. A maximum sheet width supported by the printing apparatus 100 is set as the sheet width (215.9 mm) of the Letter size. In a case where the sheet width is large as described above and the position F is located to be closer to the head recovery mechanism 119 as compared with the reading marginal position E of the sheet sensor 118, the position F is not detected, and it is possible to detect only the end portion corresponding to the position G. In a case where the print sheet having a size at which only one of the end portions can detected is fed so that the center of the print sheet is aligned with the center position C of the platen 111, the end portion of the print sheet corresponding to the position G is detected on an outer side of the position E' corresponding to the symmetrical position of the reading marginal position E with respect to the center position C.

According to the present exemplary embodiment, in a case only one of the end portions of the sheet width is detected by the sheet sensor 118 in this manner, a length twice as long as a distance between the center position C of the platen 111 and the end portion detected by the sheet sensor 118 is determined as the sheet width of the print sheet. Details of this processing will be described below.

FIG. 2C illustrates a case in which the configuration of the apparatus is modified so that both the end portions can be detected even with respect to the maximum sheet width. Herein, the head recovery mechanism 119 is relocated to the outer side, and a transverse width of the apparatus is expanded by that distance, which increases the size of the printing apparatus.

For the examples illustrated in FIGS. 2A to 2C, the example in which the output voltage that is output by the sheet sensor 118 is increased more in the location where the print sheet exists on the platen 111 than the location where the print sheet does not exist has been described. However, the configuration is not limited to this, and a sensor in which the output voltage is decreased more in the location where the print sheet exists on the platen 111 than the location where the print sheet does not exist may also be used. An output other than the voltage may be monitored.

In addition, according to the present exemplary embodiment, the sheet sensor 118 is attached to the carriage 113 provided to the printing head 112. Thus, a carriage for the sheet sensor 118 may not be provided separately in addition to the carriage 113 for the printing head 112. For that reason, it is possible to realize the downsizing of the printing apparatus, and also the cost increase can be suppressed. Furthermore, the sheet sensor 118 is provided to the carriage 113, and while the sheet sensor 118 performs the scanning, the sheet width of the print sheet is detected. For that reason, for example, as compared with the case where the plurality of sheet sensors in the number corresponding to a width of the platen 111 are arranged in the horizontal direction in FIGS. 2A to 2C, the cost increase can be suppressed.

Furthermore, according to the present exemplary embodiment, the sheet sensor 118 is installed to be next to the carriage 113 (on the left side of the carriage 113 in FIGS. 2A to 2C). Thus, a distance between the conveyance rollers 109 and 110 and the sheet discharging rollers 115 and 116 can be shortened as compared with a case in which the sheet sensor 118 is installed on a front or back side of the carriage (front or back side of the carriage 113 in FIGS. 2A to 2C), for example. Thus, it is possible to realize the downsizing of the printing apparatus. In addition, it is possible to avoid ink contamination on the print sheet which may be caused when, since the distance between the conveyance rollers 109 and 110 and the sheet discharging rollers 115 and 116 is increased, the sheet is not stably pressed down, and the printing head contacts the print sheet. For that reason, according to the present exemplary embodiment, the sheet sensor 118 is installed on the left side of the carriage 113 in FIGS. 2A to 2C.

Figure 3:
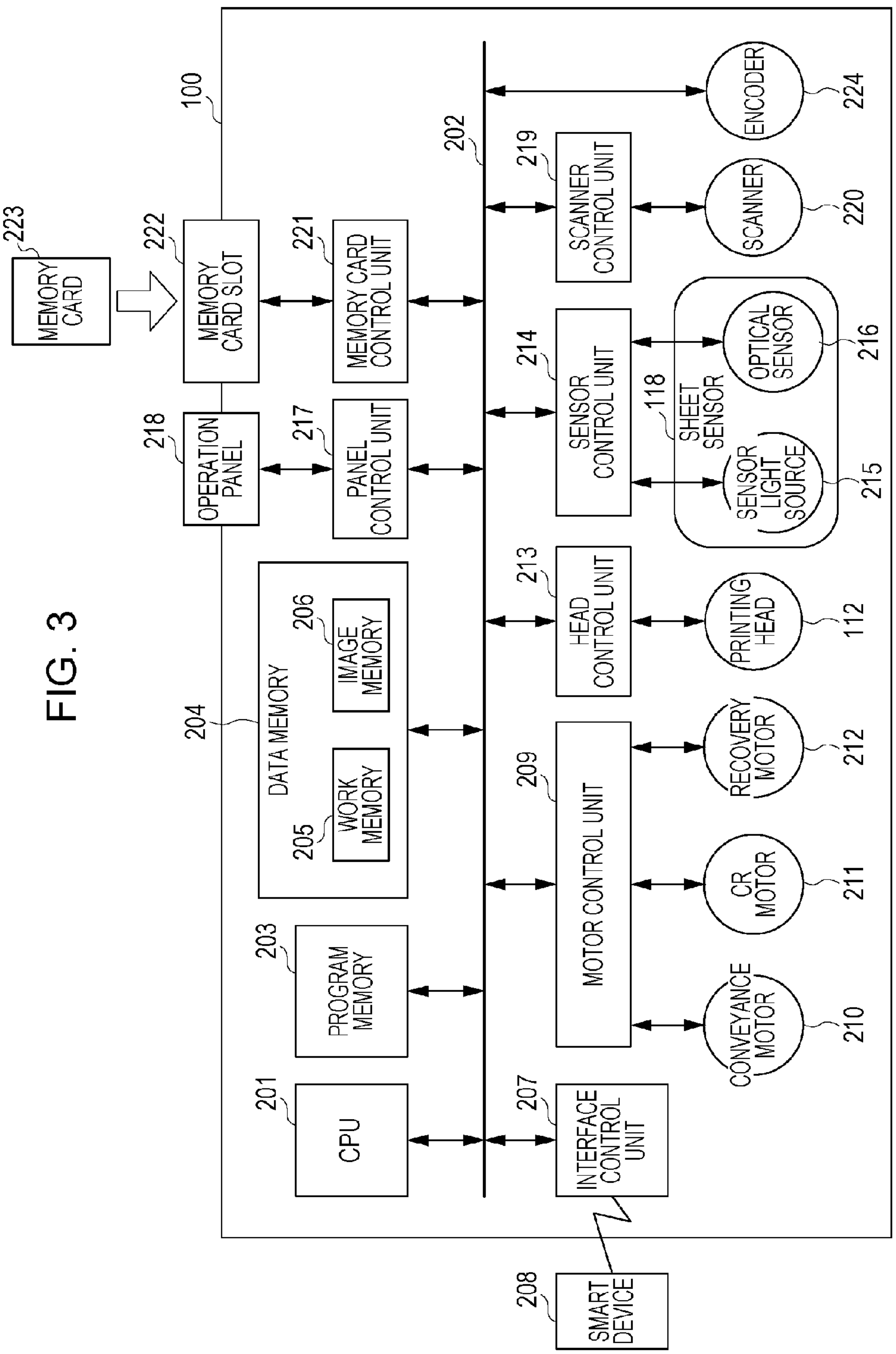
FIG. 3 is a block diagram showing a configuration of the printing apparatus.

FIG. 3 is a block diagram of a configuration of the printing apparatus 100.

A CPU 201 is a processor configured to control the printing apparatus 100. The CPU 201 is connected to a program memory 203 such as a ROM or a hard disc and a data memory 204 such as a RAM via an internal bus 202. The program memory 203 stores a program for controlling the printing apparatus 100. The CPU 201 reads out the program stored in the program memory 203 onto the data memory 204 to be executed on a work memory 205 that is allocated to the data memory 204, so that it is possible to control the printing apparatus 100. An image memory 206 is also allocated to the data memory 204, and various data such as the image data to be printed in the printing apparatus 100 are rasterized on the image memory 206 by the CPU 201.

An interface control unit 207 performs a communication with a smart device 208 such as a smart phone via an interface under the control by the CPU 201. For example, a job of a print target is received from the smart device 208, and it is also possible to notify the smart device 208 of status information of the printing apparatus 100. The interface control unit 207 may perform the communication via a wired interface such as a universal serial bus (USB) or may also perform an infrared communication or a communication via a wireless interface such as or a wireless LAN. The smart device mentioned herein refers, for example, to a smart phone or a tablet and also includes various devices such as a mobile phone.

A communication partner is not limited to the smart device 208 and may also be a personal computer. In addition, the communication partner may be a server connected via a network, a facsimile apparatus connected via a telephone circuit, or an apparatus such as a digital television set. The exemplary embodiment is not limited to the case where the print job includes the data of the print target and may be applied to a case where the printing apparatus 100 obtains the data of the print target from an external apparatus such as a server in accordance with address information included in the print job.

A motor control unit 209 controls the various motors for driving the printing mechanism of the printing apparatus 100 under the control by the CPU 201. A conveyance motor 210 drives the sheet feeding roller 103, the conveyance rollers 105, 106, 109, and 110 and the sheet discharging rollers 115 and 116 illustrated in FIG. 1 while following the control of the motor control unit 209. A carriage motor 211 (CR motor) drives the carriage 113 while following the control by the motor control unit 209 to cause the carriage 113 to move reciprocally. A recovery motor 212 drives the head recovery mechanism 119 while following the control by the motor control unit 209. The recovery motor 212 performs a drive of the head recovery mechanism 119 and a control in synchronism with the drive of the carriage 113 to execute a recovery operation for keeping an appropriate state of the printing head 112.

A head control unit 213 controls the printing head 112 while following the control by the CPU 201 to cause the printing head 112 to eject the recording material such as the ink. The CPU 201 drives both the printing head 112 and the conveyance motor 210 to cause the printing head 112 to perform scanning to print the image on the print sheet. That is, the CPU 201 in the printing apparatus 100 operates as a print control apparatus to control various motors and the printing head 112 constituting the printing mechanism and cause the printing mechanism to print the image. That is, the CPU 201 can control the printing head 112 via the head control unit 213. The printing head 112 is controlled in synchronism with the reciprocal movement of the carriage 113 to form the image on the print sheet 104.

A sensor control unit 214 causes a sensor light supply 215 included in the sheet sensor 118 to emit light while following the control by the CPU 201 and also causes an optical sensor 216 provided to the sheet sensor 118 to receive reflected light. The sensor control unit 214 obtains an output level indicating an intensity of the light received by the optical sensor 216. When the CPU 201 obtains the output level obtained by the sensor control unit 214, the CPU 201 can perform the determination on the sheet width illustrated in FIGS. 2A to 2C. It is noted that the CPU 201 determines a sheet size including a sheet length in accordance with the thus determined sheet width by processing that will be described below.

A panel control unit 217 controls an operation panel 218 while following the control by the CPU 201. The operation panel 218 includes an operation device such as a key or a touch panel on which a user performs an operation and a display panel on which various information such as images can be displayed. For example, when the user operates the operation device of the operation panel 218, an instruction of the user is input to the panel control unit 217, and the instruction is further input to the CPU 201. The panel control unit 217 displays the image rasterized on the image memory 206 on the display panel of the operation panel in accordance with the instruction of the CPU 201.

A scanner control unit 219 controls a scanner 220 while following the control by the CPU 201 and causes the scanner 220 to read an original placed on a platen glass of the scanner 220 to input the read image. The input image is stored in the image memory 206 by the scanner control unit 219. More specially, the image read by the scanner 220 is stored in the image memory 206 in the data memory 204. Then, the image is transmitted to the smart device 208 or saved as an image file in a memory card 223. The CPU 201 can also realize a copy function by controlling the printing mechanism to print the image read by the scanner 220 on the print sheet.

A memory card control unit 221 performs write and read of various data with respect to the memory card 223 mounted to a memory card slot 222 under the control by the CPU 201.

The encoder 224 specifies a position of the carriage 113 when the carriage 113 scans along the guide rail 114. The CPU 201 specifies the position x of the sheet sensor illustrated in FIGS. 2A to 2C on the basis of the position of the carriage 113 specified by the encoder 224 and the attachment position of the sheet sensor 118 to the carriage 113.

As described above, the CPU 201 determines the sheet size including also the sheet length in accordance with the sheet width determined by the sheet sensor 118 according to the present exemplary embodiment. In the printing apparatus 100 according to the present exemplary embodiment, the sheet sensor 118 is provided to the carriage 113 together with the printing head 112. Various motors and the guide rail 114 for moving the carriage 113 and members such as the encoder 224 for specifying the positions of the carriage 113 are commonly used for both the printing by the printing head 112 and the detection of the sheet width by the sheet sensor 118. For that reason, the above-described members may not be provided for the detection of the sheet width separately in addition to the members for the printing, and it is possible to avoid the increase in the size of the printing apparatus 100.

Figure 4:
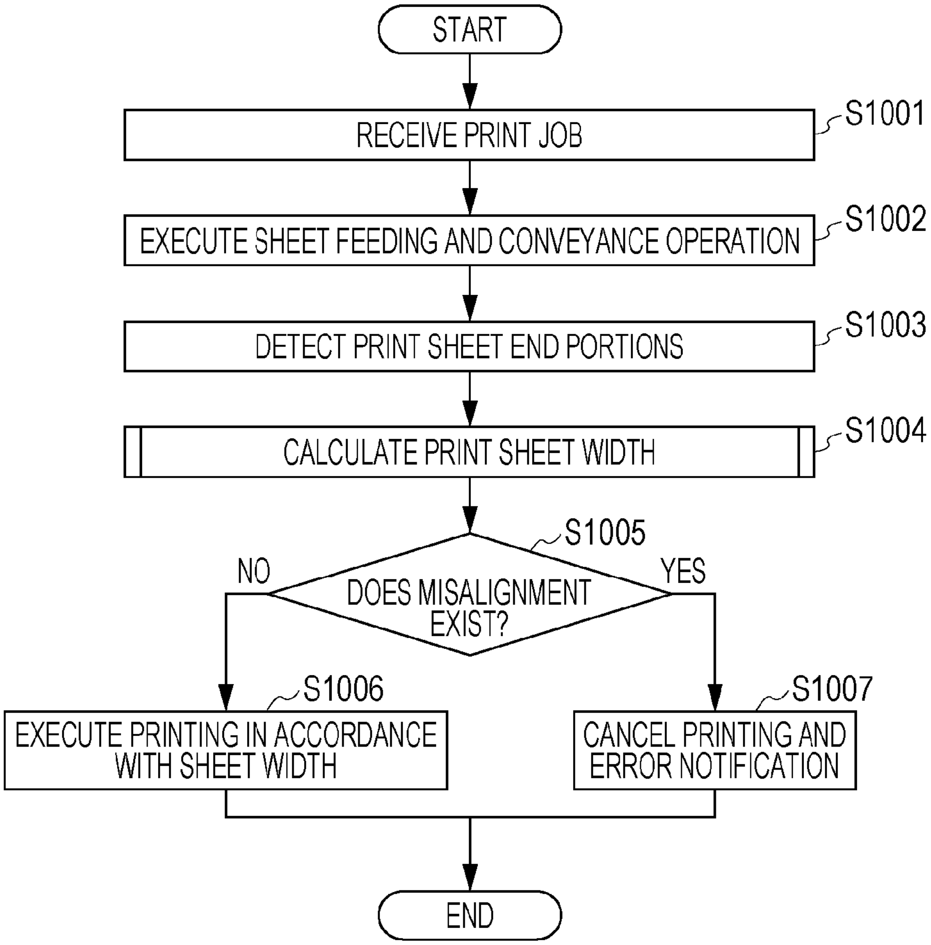
FIG. 4 is a flow chart illustrating details of a processing performed by a CPU when executing a printing operation according to the exemplary embodiment.

FIG. 4 is a flow chart illustrating details of processing by the CPU 201 at the time of the printing execution according to the present exemplary embodiment. A program for realizing the processing of the flow chart illustrated in FIG. 4 is stored in the program memory 203, and the CPU 201 expands and executes this program in the work memory 205, so that the processing illustrated in FIG. 4 is realized.

In S1001, the CPU 201 receives a print job from the smart device 208 via the interface control unit 207.

Next, the CPU 201 controls the printing mechanism and performs a feeding operation of the print sheet in S1002. According to this, among the print sheets 102 loaded on the sheet feeding tray 101, the print sheet 104 placed on the top is picked up by the sheet feeding roller 103. Then, the picked-up print sheet 104 is conveyed by the conveyance rollers 105, 106, 109, and 110 to a position below the sheet sensor 118 as illustrated in FIG. 1.

In S1003, the CPU 201 causes the sheet sensor 118 via the sensor control unit 214 to detect the sheet width of the print sheet conveyed in S1002. Specifically, the CPU 201 causes the sheet sensor 118 to detect the position G and the position F corresponding to both the end portions of the print sheet in FIGS. 2A to 2C or only the position G in a case where the width of the print sheet is large. Subsequently, values corresponding to the position G and the position F (or only the position G) in the position x of the sheet sensor in FIGS. 2A to 2C are obtained by the CPU 201 as positional information indicating the positions of the end portions of the print sheet.

In S1004, the CPU 201 calculates the sheet width of the print sheet from the positions of both the ends (or one of the ends) of the print sheet which are detected in S1003. It is noted that in S1004, it is determined whether or not a conveyance deviation (misalignment) of the print sheet exists, and the sheet width is calculated when it is determined that the conveyance deviation does not exist. Details of the processing in S1004 will be described below by using FIG. 5.

In S1005, the CPU 201 determines whether or not the misalignment exists from the result in S1004. In a case where the misalignment does not exist, the flow proceeds to S1006. In S1006, the printing is executed in accordance with the sheet width calculated in S1004. Specifically, the CPU 201 refers to the sheet size table illustrated in FIG. 7 and specifies a sheet length corresponding to the sheet width calculated in S1004. Then, the CPU 201 rasterizes the data of the print target corresponding to the print job received in S1001 in a size in accordance with the above-described sheet width and sheet length onto the image memory 206 as an image. Subsequently, the printing mechanism is caused to print the rasterized image on the print sheet fed and conveyed in S1002. Thereafter, the print sheet on which the printing has been executed is discharged to the sheet discharging tray 117 by the sheet discharging rollers 115 and 116.

FIG. 7 illustrates a sheet size table according to the present exemplary embodiment. This sheet size table includes a sheet size 300 that may be used in the printing apparatus 100, a sheet width 301 of the relevant size, a sheet length 302, and an aspect ratio 303. The unit for the sheet width 301 and the sheet length 302 is millimeter (mm).

The sheet size table is stored in the program memory 203, and the CPU 201 can refer to the sheet size table by reading out the sheet size table from the program memory 203 onto the data memory 204. The configuration is not limited to a case in which information of the sheet width 301 is held in a table format, and various methods of storing the sheet width 301 in associated with the sheet size are adopted.

According to the present exemplary embodiment, the CPU 201 determines a size of the print sheet in accordance with the sheet width calculated in S1004. Specifically, the CPU 201 specifies the sheet size 300 having the sheet width 301 within a predetermined range of the sheet width detected by the sheet sensor 118 in the sheet size table as the size of the print sheet 104 conveyed in the printing apparatus 100. A reason why the predetermined range is prepared as described above is that the intensity of the reflected light from the print sheet varies depending, for example, on a state of the print sheet or an environment where the printing apparatus 100 is installed, and an error between the detection result of the sheet sensor 118 and the actual sheet width may be caused in some cases.

In view of the above, for example, the above-described predetermined range is set as plus or minus 3 mm, and in a case where 126.0 mm is detected as the sheet width by the sheet sensor 118, the sheet size 300 corresponding to the sheet width 301 within the range between 123.0 mm and 129.0 mm is specified as a candidate for the size of the print sheet. As illustrated in the sheet size table of FIG. 4, in this case, 2L corresponding to the sheet width 301 (127.0 mm) is specified as the candidate. In S1006, an image having a size corresponding to 2L is printed.

The sheet size may not be specified uniquely unlike the above-described case, and a plurality of sheet sizes that are close to the sheet width may be specified as the candidates for the size of the relevant print medium in some cases. For example, in a case where 99.0 mm is detected as the sheet width by the sheet sensor 118, Envelope Y6 (sheet width: 98.0 mm), Postcard (sheet width: 100.0 mm), and 4×6 (sheet width: 101.6 mm) are included in the range of the sheet width between 96.0 mm and 102.0 mm. Similarly, in a case where 213.0 mm is detected as the sheet width, A4 (sheet width: 210.0 mm) and Letter (sheet width: 215.9 mm) are specified as the candidates for the sheet size.

In this case, the candidate sheet size corresponding to the size of the print target image is extracted from the plurality of candidate sheet sizes. This extraction is executed under various conditions. For the conditions, for example, a type of the print sheet set for the relevant printing and destination information of the printing apparatus 100 are used. The type of the print sheet is designated, for example, by an instruction of the user in the apparatus that transmits the print job. Type information indicating the designated type is included in print setting information, and the type information is obtained, so that the type of the print sheet is specified. It is noted that "Envelope", "Postcard", or the like is designated as this type, and the print processing in accordance with the type is executed. For example, in a case where the plurality of candidates are "Postcard" and "4×6" and the type of the print sheet is "Postcard", the candidate "Postcard" is extracted since "Postcard" is a more appropriate sheet size than "4×6".

The "destination information" is information indicating a country or an area to which the printing apparatus 100 is shipped or sold, and this information is stored in the program memory 203. The country or the area where the printing apparatus 100 is used can be found out by referring to this destination information. For example, in a case where the candidate sheet sizes are "A4" and "Letter" and the destination information is "Japan", since the A4 size is more frequently used than the Letter size in Japan, the candidate "A4" can be extracted. The "destination information" is not limited to the information indicating the country or the area where the printing apparatus 100 is sold as described above, and for example, information on a language setting may also be used. In the printing apparatus 100, to display a notification or a guidance for the user on the operation panel 218, a language used for this display is set. The country or the area where the printing apparatus 100 is used may also be specified on the basis of the information on the language setting.

In addition, conditions such as the type of the print sheet and the destination information may be combined with each other. For example, in a case where the candidate is not extracted uniquely on the basis of the type of the print sheet, a further extraction may be carried out on the basis of the destination information. For example, in a case where the candidate sheet sizes are "4×6", "Envelop N3", and "2L" and the type of the print sheet is "Others" other than "Envelope" or "Postcard", "Envelop N3" corresponding to "Envelope" is excluded, but "4×6" and "2L" remain as the candidates. In view of the above, the destination information is referred to. For example, in a case where the destination information indicates "United States", since "4×6" is used more frequently than "2L" in United States, "4×6" can be extracted.

In a case where the sheet size having the sheet width 301 within the predetermined range of the sheet width detected by the sheet sensor 118 in the sheet size table does not exist, the printing is executed in accordance with a sheet size corresponding to the sheet width 301 closest to the detected sheet width. Alternatively, such a control may be performed that the user is notified of an error indicating that a standard sheet size corresponding to the detected sheet width is not specified, and the printing is cancelled.

In S1005, in a case where the misalignment exists, the flow proceeds to S1007.

In S1007, the CPU 201 cancels the printing and notifies the user that the misalignment exists as an error. In S1007, the print sheet used for the printing is conveyed to a position below the sheet sensor 118 in FIG. 1 to detect the width of the print sheet in S1003 by the sheet sensor 118. In S1007, to cancel the printing (printing based on the print job received in S1001), the CPU 201 does not perform the printing by the printing head 112 and controls the conveyance motor 210 to discharge the print sheet to the sheet discharging tray 117.

In addition, in S1007, the CPU 201 notifies the user that the printing is cancelled as an error. For example, the panel control unit 217 is controlled, and a display indicating that the misalignment occurs is displayed on the operation panel 218. A method for the error notification is not limited to the display, and for example, a warning sound or a sound for informing a content of a warning may also be output from a speaker that is not illustrated in the drawing.

By the above-described processing illustrated in FIG. 4, it is possible to print the image having the size in accordance with the print sheet conveyed in the printing apparatus 100.

In the above explanation, in S1001, the case of the print job from the smart device 208 connected via the interface has been described, but the printing from a remote location connected by a telephone circuit or a network circuit may also be performed. The description has been given while the apparatus that issues the print job is set as the smart device 208, but an apparatus such as a host computer or a digital television set may also be used instead of the smart device 208. A mode in which the print job is directly received from the apparatus operated by the user or a mode in which the print job is received through an intermediate apparatus such as a print server or a cloud service may be adopted.

When the data of the print target included in the print job received in S1001 is image data such as a JPEG image file, decompression processing is performed in S1006, and bitmap data is rasterized on the image memory 206. In a case where the data of the print target is vector data or text data, rendering processing is performed in the work memory 205, and bitmap data is rasterized.

The print job received in S1001 may contain the print setting information, and the sheet size may be set with respect to the print job as the print setting. In a case where the size of the print sheet based on the sheet width calculated in S1004 is different from the sheet size set as the print setting, the printing may be cancelled, and the error notification to the user may be performed. For the cancelling of this printing and the error notification, the method used in S1007 can be adopted.

Furthermore, instead of the cancellation of the printing in S1007, the printing may be executed after the print position is corrected in accordance with the misalignment.

Next, details of the calculation processing for the sheet width of the print sheet in S1004 will be described.

Figure 5:
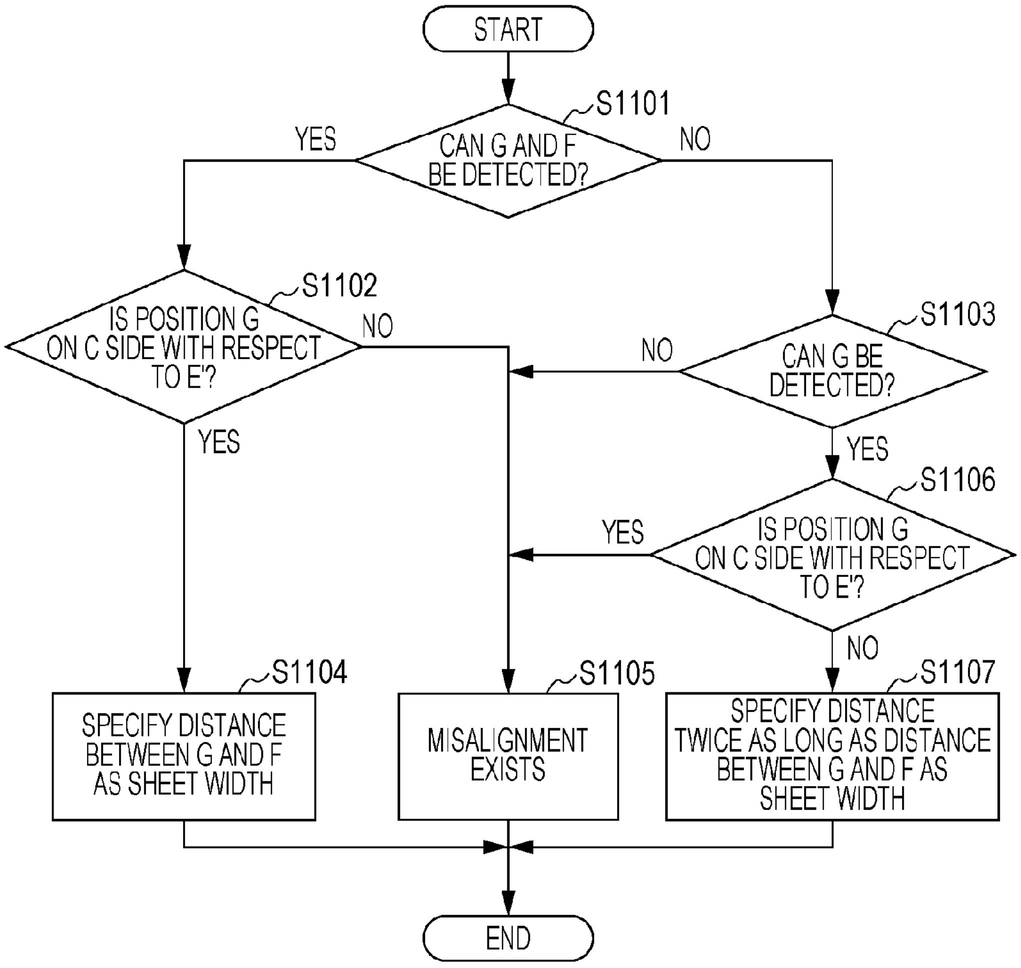
FIG. 5 is a flow chart of calculation processing for calculating a print sheet width.

FIG. 5 is a flow chart of the calculation processing for the sheet width of the print sheet.

In S1101, the CPU 201 determines whether or not both the position G and the position F corresponding to both the end portions of the print sheet in FIGS. 2A to 2C are detected by the sheet sensor 118 in S1003 of FIG. 4. In a case where both the position G and the position F are detected, the flow proceeds to S1102.

In S1102, the CPU 201 determines whether or not the position G is on the position C side with respect to the position E'. That is, in a case where the conveyance is performed so that the center of the print sheet is aligned with the center position C of the platen 111 and the positions of both the end portions of the print sheet are detected, the position G is detected to be in the position on the right side (position C side) in FIGS. 2A to 2C with respect to the position E'. For that reason, if the position G is not on the position C side with respect to the position E', the center of the print sheet is not aligned with the center position C, and it is possible to determine that the print sheet is conveyed while being deviated onto the left side in FIGS. 2A to 2C.

In S1102, when it is determined that the position G is not on the position C side with respect to the position E', the flow proceeds to S1105.

In S1105, the CPU 201 determines that the misalignment of the print sheet exists (the print sheet is conveyed while being deviated from the original position), and the flow ends.

On the other hand, when it is determined that the position G is on the position C side with respect to the position E' in S1102, the flow proceeds to S1104. In S1104, the distance between the position G and the position F detected by the sheet sensor 118 in S1003 is specified as the width of the print sheet that is conveyed in the printing apparatus 100.

FIGS. 6A to 6D are explanatory diagrams for describing a sheet width determination and a misalignment determination of the print sheet.

Figure 6A:
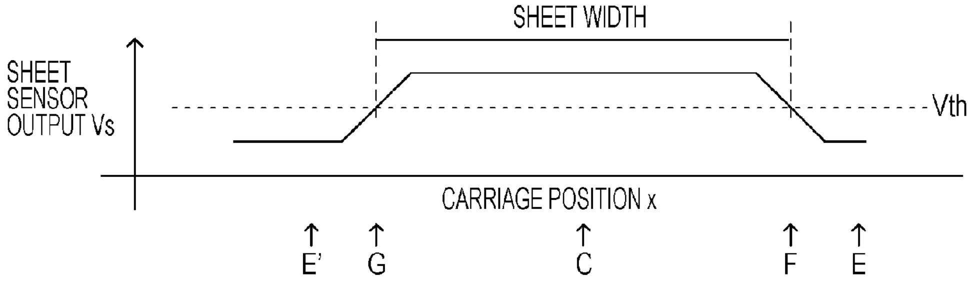
FIGS. 6A to 6D are diagrams explanatory of a sheet width determination and a print sheet misalignment determination.

FIG. 6A illustrates a case in which the print sheet having the A5 size is fed without a misalignment. In this case, in S1101 of FIG. 5, it is determined that both the position G and the position F are detected, and also in S1102, it is determined that the position G is on the C side with respect to the position E'. For that reason, in the case of FIG. 6A, in S1104, the distance between the position G and the position F is specified as the width of the sheet. Subsequently, in S1006 of FIG. 4, the image having the size based on this specified sheet width is printed.

Figure 6B:
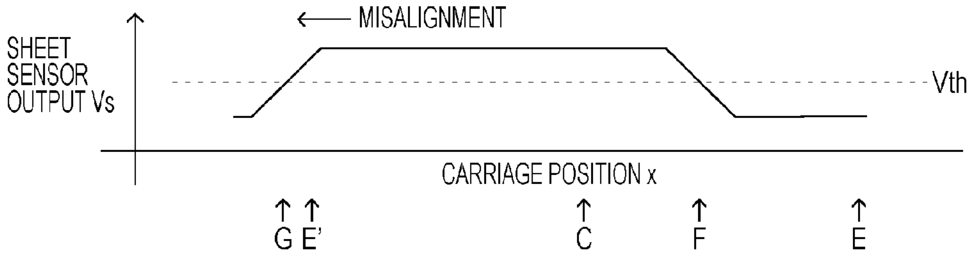

FIG. 6B illustrates an example of a case in which the sheet having the A5 size is fed while being deviated onto a left side. In S1101 of FIG. 5, it is determined that both the position G and the position F are detected, and also in S1102, it is determined that the position G is not on the C position side with respect to the position E'. For that reason, it is determined in S1105 of FIG. 5 and in S1005 of FIG. 4 that the misalignment of the print sheet exists, and the print cancelation and the error notification are executed in S1007 of FIG. 4.

In S1101 of FIG. 5, when it is determined that both the position G and the position F are not detected, the flow proceeds to S1103. In S1103, the CPU 201 determines whether or not the position G is detected. When it is determined that the position G is not detected, the flow proceeds to S1105. In this manner, when it is determined that neither the position G nor the position F is detected, it is conceivable that this may be a case where the print sheet is not conveyed to the platen 111 or a case where an appropriate detection is not performed by the sheet sensor 118. Thus, in order that the printing is cancelled in S1007 of FIG. 4, here, supposedly in S1105, it is determined that the misalignment of the print sheet occurs.

When it is determined in S1103 that the position G is detected, the flow proceeds to S1106. In S1106, the CPU 201 determines whether or not the position G is on the position C side with respect to the position E'. In a case where only the position G is detected among the positions G and F, since the right end of the print sheet in FIGS. 2A to 2C is on the right side with respect to the position E, under ordinary circumstances, the position G is supposed to be on the left side with respect to the position E'. For that reason, when it is determined in S1106 that the position G is on the position C side with respect to the position E', the flow proceeds to S1105, and it is determined that the misalignment of the print sheet exists.

In S1106, when it is determined in S1106 that the position G is on the position C side with respect to the position E', the flow proceeds to S1107. The case where the processing is transited to S1107 is a case where only the position G is detected by the sheet sensor 118 among the position G and the position F and furthermore it is determined that the misalignment of the print sheet (conveyance deviation of the print sheet) is not caused.

In S1107, the CPU 201 multiplies a distance between the center position C of the platen 111 and the position G corresponding to the left end of the print sheet FIGS. 2A to 2C which is detected by the sheet sensor 118 by two and specifies the twofold distance as the width of the print sheet.

That is, in a case where the print sheet is appropriately conveyed so that the center of the print sheet is aligned with the center position C of the platen 111, the distance between the position G (left end of the print sheet) and the center position C in FIGS. 2A to 2C is half of the length corresponding to the width of the print sheet. In view of the above, in S1107, since the length twice as long as the distance between the position G and the center position C is specified as the sheet width, even in a case where the position F (position of the right end of the print sheet) is not detected, it is possible to appropriately specify the width of the print sheet.

In the above explanation, as a factor of the case where the position F (position of the right end of the print sheet) is not detected, the case where the width of the print sheet is large and the right end of the print sheet is on the right side with respect to the reading marginal position E has been described. However, the above-described factor is not limited to this case. For example, even in a case where the reflected light from the print sheet is weak because of the detection error of the sheet sensor 118, the specification of the print sheet, or the like and then only one end of the print sheet is detected, the processing according to the present exemplary embodiment can be applied. In this case, by specifying the length twice as long as the distance between the position G (or the position F) and the center position C as the width of the print sheet, it is possible to specify the appropriate sheet width.

Figure 6C:
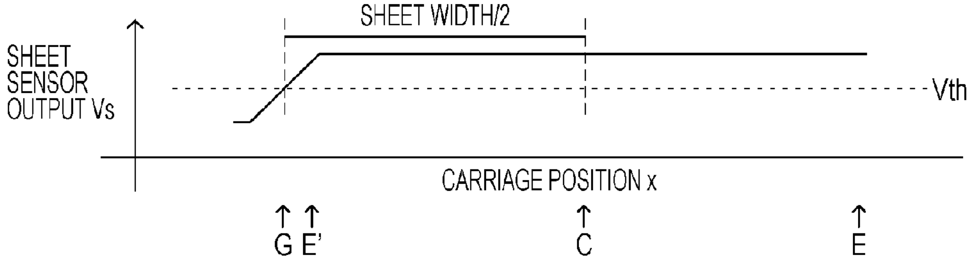

FIG. 6C illustrates an example of a case in which the print sheet is appropriately conveyed so that the center of the print sheet having the Letter size is aligned with the center position C of the platen 111. In this case, it is determined in S1101 of FIG. 5 that the position F is not detected, and the flow proceeds to S1103. It is determined in S1103 that the position G is detected, and the flow proceeds to S1106. It is determined in S1106 that the position G is not on the position C side with respect to the position E', and the flow proceeds to S1107. It is determined in S1107 that the length twice as long as the distance between the center position C of the platen 111 and the position G is specified as the sheet width of the print sheet. Then, in S1006 of FIG. 4, the image having the size based on this specified sheet width is printed.

Figure 6D:
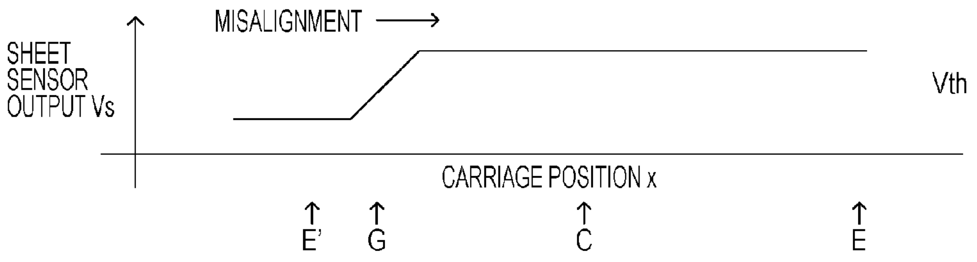

FIG. 6D illustrates an example of a case in which the print sheet having the A4 size is fed while being deviated onto the right side. In this case, in S1101 and S1103 of FIG. 5, it is determined that the position G is detected, and the flow proceeds to S1106. In S1106, it is determined that the position G is on the position C side with respect to the position E'. The flow then proceeds to S1105, and it is determined that the misalignment of the print sheet exists. For that reason, it is determined that the misalignment of the print sheet exists in S1105 of FIG. 5 and S1005 of FIG. 4, and the print cancelation and the error notification are executed in S1007 of FIG. 4.

According to the above-described exemplary embodiment, the printing based on the print job received from an external apparatus of the printing apparatus 100 has been described, but the exemplary embodiment may be applied to a case in which the size of the print sheet is specified on the basis of the detection result of the sheet sensor 118 when a copy function is executed in the printing apparatus 100. For example, when an image stored in the memory card 223 mounted to the memory card slot 222 is printed in accordance with the print setting set in the operation panel 218 by the user, the above-described determination processing for the print sheet size may be executed. In a case where the printing is executed in accordance with the print setting set designated in the printing apparatus 100 by the user as described above, the configuration is not limited to an external memory such as the memory card 223, and the exemplary embodiment may be applied to a case where an image stored in an internal memory provided in the printing apparatus 100 is printed. The exemplary embodiment may also be applied to a case where an image stored in an external apparatus such as a server connected to the printing apparatus 100 via a network is printed.

Furthermore, according to the above-described exemplary embodiment, the example in which the sheet sensor 118 of the printing apparatus 100 detects the width of the sheet has been described. The configuration is not limited to this, and the exemplary embodiment may also be applied to a case where a length of the sheet is detected by the sensor or a case where both the width and the length of the sheet are detected.

According to the above-described exemplary embodiment, the example in which the printing apparatus 100 performs the conveyance of the print sheet so that the center of the print sheet is aligned with the center of the platen 111. However, the configuration is not limited to this, and the conveyance may be performed in a manner that a predetermined position of the print sheet is aligned with a predetermined position of the platen 111. For example, the conveyance may be performed so that one of the end portions of the print sheet is abutted against an end portion of the platen 111. In this case, when the position of the one end portion of the print sheet is detected by the sensor, it is possible to specify a distance between the detected position and the end portion of the platen 111 against which the print sheet is abutted as the sheet width of the print sheet.

Furthermore, as described above, the sheet width is determined on the basis of the positions of the end portions of the print sheet detected by the sheet sensor 118 according to the present exemplary embodiment. In the sheet size table illustrated in FIG. 7, the sheet size 300 having the sheet width 301 within a predetermined range of the sheet width is specified as the size of the print sheet 104 conveyed in the printing apparatus 100. In this case, the above-described range may be adjusted on the basis of the detection result by the sheet sensor 118. For example, the range in a case where the position of only one end of the print sheet is detected is set to be wider than the range in a case where the positions of both the ends of the print sheet are detected. According to this setting, even if a slight misalignment occurs when the print sheet is conveyed, it is possible to specify the appropriate sheet size.

According to the above-described exemplary embodiment, the example in which the print sheet is conveyed on the platen provided to the printing apparatus has been illustrated, but the configuration is not limited to this. Various shapes of the conveyance path in the printing apparatus may be adopted.

In addition, according to the above-described exemplary embodiment, the example has been illustrated in which the CPU 201 provided to the printing apparatus 100 functioning as an information processing apparatus executes the determination processing for the sheet size illustrated in FIG. 4 and FIG. 5. However, the configuration is not limited to this, and the information processing apparatus such as a host computer or a server connected to the printing apparatus 100 and configured to cause the printing apparatus 100 to execute the printing may function as the print control apparatus according to the present exemplary embodiment, so that the processing according to the present exemplary embodiment may be executed.

Specifically, the processings in S1003 to S1007 of FIG. 4 are executed when the host computer, the server, or the smart device transmits the print job to the printing apparatus 100. That is, when the apparatus transmits the print job to the printing apparatus 100, positional information indicating the positions of the end portions of the print sheet detected by the sheet sensor 118 of the printing apparatus 100 is obtained. The sheet width of the print sheet is then specified in accordance with the positions of the end portions of the print sheet indicated by the obtained positional information, and the sheet size in accordance with the specified sheet width is determined. Subsequently, the print target image having the size corresponding to the determined sheet size is rasterized on the memory provided to the host computer, the server, or the smart device, and the rasterized image is transmitted to the printing apparatus 100 as the print job to cause the printing apparatus 100 to execute the printing. Specifically, under the control by the CPU 201 of the printing apparatus 100, the image received from the host computer, the server, or the smart device is printed on the print sheet by the printing mechanism in the printing apparatus 100.

In the above-described configuration, in a case where the cancellation of the printing is performed in S1007 of FIG. 4, the transmission of the print job is cancelled and the error is issued in the host computer, the server, or the smart device. Specifically, the display indicating that the printing is cancelled and the display for asking the user to check both or one of the size of the print sheet set in the printing apparatus 100 and the set sheet size are performed. In a case where the error is displayed in the host computer, the display is performed on a display apparatus provided to the host computer or an external display apparatus connected to the host computer. In a case where the cancellation of the printing and the error display in S1007 are performed in the server, a client apparatus that has transmitted the print job to the server is notified of the content of the error display, and the error display is performed on an internal or external display apparatus of the client apparatus.

Another example of the case where the processing according to the present exemplary embodiment is performed in the host computer, the server, or the smart device, the determination for the sheet size based on the detection result by the sheet sensor 118 is performed in the host computer, the server, or the smart device. The creation of the print target image may also be executed by the CPU 201 of the printing apparatus 100. In this case, for example, the sheet size determined in the host computer, the server, or the smart device is transmitted to the printing apparatus 100 as the sheet size of the print setting together with the data of the print target. Subsequently, the CPU 201 of the printing apparatus 100 changes a magnification of the image based on the thus received data of the print target in accordance with the sheet size as the thus received printing setting and causes the printing mechanism to execute the printing. With regard to assigning tasks of the processings between the printing apparatus 100 and the apparatus such as the host computer, the server, or the smart device, other various configurations can be applied to the present exemplary embodiment.

According to the above-described exemplary embodiment, although the print sheet has been described as an example for the print medium on which the image is printed by the printing apparatus, the configuration is not limited to this, and an OHP sheet may be used. The configuration is not limited to a rectangular print medium such as the print sheet, but disc-like recoding media such as a CD and a DVD.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition, a program code for realizing the functions of the present exemplary embodiment may be executed by a single computer (CPU, MPU) or may also be executed by a plurality of computers in cooperation with each other. Furthermore, the program code may be executed by the computer, or hardware such as a circuit for realizing the functions of the program code may be provided. Alternatively, a part of the program code is realized by the hardware, and the remaining part may be executed by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137058, filed Jun. 28, 2013, which is hereby incorporated by reference herein in its entirety.

What is claimed is:

1. A print control apparatus comprising:

an obtaining unit configured to obtain positional information for specifying positions of one end or both ends of a print medium detected by a sensor when the print medium is conveyed in a printing mechanism along a conveyance path such that a center of the print medium is aligned with a center of the conveyance path; and a specification unit configured to specify, in a case where positions of both ends of the print medium are specified by the positional information obtained by the obtaining unit, a width of the print medium in accordance with the specified positions of both ends, and to specify, in a case where the position of only one end of both ends of the print medium is specified by the positional information, a width corresponding to a length twice as long as a distance between the specified position of the one end of the print medium and a position corresponding to the center of the conveyance path as the width of the print medium.

2. The print control apparatus according to claim 1, further comprising:

a print control unit configured to cause a printing unit to print an image having a size determined based on the width of the print medium specified by the specification unit.

3. The print control apparatus according to claim 2, wherein the print control unit causes the printing unit to execute printing on the print medium conveyed along the conveyance path, by activating a printing head with respect to the print medium, and the sensor is provided in a position corresponding to a position of the printing head and detects a size of the print medium when the print medium is conveyed.

4. The print control apparatus according to claim 1, further comprising:

a determination unit configured to determine whether a conveyance deviation of the print medium conveyed to the conveyance path exists, based on the position corresponding to the center of the conveyance path, a position corresponding to an end of the conveyance path, and the position of the one end of the print medium specified by the positional information obtained by the obtaining unit.

5. The print control apparatus according to claim 4, wherein, in a case where the determination unit determines that a conveyance deviation exists, the print control unit executes a print control in a manner that an image is not printed on the conveyed print medium.

6. The print control apparatus according to claim 5, further comprising:

a notification unit configured to notify a user of execution of the print control in the manner that the image is not printed, when the print control unit executes the print control in a manner that the image is not printed on the conveyed print medium.

7. A print control method for a print control apparatus, the print control method comprising:

obtaining positional information for specifying positions of one end or both ends of a print medium detected by a sensor when the print medium is conveyed in a printing mechanism along a conveyance path such that a center of the print medium is aligned with a center of the conveyance path; and specifying, in a case where positions of both ends of the print medium are specified by the obtained positional information, a width of the print medium in accordance with the specified positions of both ends, and specifying, in a case where the position of only one end of both ends of the print medium is specified by the positional information, a width corresponding to a length twice as long as a distance between the specified position of the one end of the print medium and a position corresponding to the center of the conveyance path as the width of the print medium.

8. The print control method according to claim 7, further comprising:

causing a printing unit to print an image having a size determined based on the specified width of the print medium.

9. The print control method according to claim 8, wherein causing includes causing the printing unit to execute printing on the print medium conveyed along the conveyance path, by activating a printing head with respect to the print medium, and the sensor is provided in a position corresponding to a position of the printing head and detects a size of the print medium when the print medium is conveyed.

10. The print control method according to claim 8, wherein, in a case where it is determined that a conveyance deviation exists, causing includes executing a print control in a manner that an image is not printed on the conveyed print medium.

11. The print control method according to claim 10, further comprising:

notifying a user of execution of the print control in the manner that an image is not printed, when executing the print control in a manner that the image is not printed on the conveyed print medium.

12. The print control method according to claim 7, further comprising:

determining whether a conveyance deviation of the print medium conveyed to the conveyance path exists, based on the position corresponding to the center of the conveyance path, a position corresponding to an end of the conveyance path, and the position of the one end of the print medium specified by the obtained positional information.

13. A storage medium that stores a program for causing a computer to execute the print control method according to claim 7.

* * * * *